US006507949B1

(12) United States Patent
Jonason et al.

(10) Patent No.: US 6,507,949 B1

(45) Date of Patent: Jan. 14, 2003

(54) INFORMATION SYSTEM

(76) Inventors: Joakim Jonason, Segersta Herrgard, Balsta (SE), S-746 93; Mats Dahlgren, Erik Dahlbergsgatan 9A, Helsingborg (SE), S-254 38; Mats Hylin, Jagarbacken 12, Danderyd (SE), S-182 35

(*) Notice: Subject to any disclaimer, the term of this patent is extended or adjusted under 35 U.S.C. 154(b) by 0 days.

(21) Appl. No.: 09/305,706

(22) Filed: May 5, 1999

(30) Foreign Application Priority Data

Feb. 23, 1999 (SE) ........................................ 9900637

(51) Int. Cl.[7] ........................ H04N 7/16; H04N 7/025; H04N 9/74; G09G 1/08

(52) U.S. Cl. ........................ 725/22; 725/32; 348/578; 345/13

(58) Field of Search ........................ 725/32–36, 22; 348/578; 345/13; 705/14

(56) References Cited

U.S. PATENT DOCUMENTS 5,099,319 A 3/1992 Esch et al.
5,412,416 A 5/1995 Nemirofsky
5,448,263 A 9/1995 Martin
5,499,046 A 3/1996 Schiller et al.
5,508,713 A 4/1996 Okouchi
5,565,911 A 10/1996 Ishikawa et al.
5,568,279 A 10/1996 Hinman et al.
5,612,741 A * 3/1997 Loban et al. ............... 348/383
5,634,018 A 5/1997 Tanikoshi et al.
5,642,484 A 6/1997 Harrison et al.
5,675,637 A 10/1997 Szlam et al.
5,745,688 A 4/1998 Oka
5,848,397 A * 12/1998 Marsh et al. ................ 705/14

* cited by examiner

*Primary Examiner*—Andrew Faile
*Assistant Examiner*—Hunter Lonsberry
(74) *Attorney, Agent, or Firm*—Pierce Atwood

(57) ABSTRACT

The invention relates to a method and an arrangement of assigning an information-category and a priority of exposure for spots or blocks of information in a digital information system comprising interfaces for data and telecommunication for round-the-clock transmission of information at places accessible to and frequented by the general public including places where television sets are placed, such that a control center has communication interfaces for coordinating and controlling display devices, with the control center being able to create and update an exposure list in real time. The exposure list contains information including how many times an information is to be exposed during a specific time period. Single spots or blocks of information to a specific information-category and a priority for exposure. The information is displayed according to the assigned priority, thus exposure interruption due to visual inaccessibility for information viewers is evened out during said specific time period for single spot or block information.

20 Claims, 2 Drawing Sheets

50

| TIME | SUBJECT | CATEGORY | PRIORITY | EXPOSE |
|---|---|---|---|---|
| * | - | - | - | - |
| * | - | - | - | - |
| * | - | - | - | - |
| 18.00 | CARTOON | PLEASURE | 1,00 | 5,00 |
| 18.05 | COMMERCIAL | CARS 1 | 1,00 | 2,00 |
| 18.08 | COMMERCIAL | TOOTHPASTE | 1,00 | 5,00 |
| 18.10 | COMMERCIAL | CARS 2 | 1,00 | 3,00 |
| * | - | - | - | - |
| * | - | - | - | - |
| * | - | - | - | - |
| 19.00 | CARTOON | PLEASURE | 0,08 | 5,00 |
| 19.05 | INFORMATION | TIMETABLE | - | - |
| 19.08 | COMMERCIAL | TOOTHPASTE | 0,08 | 5,00 |
| 19.10 | COMMERCIAL | CARS 2 | 0,67 | 3,00 |
| * | - | - | - | - |
| * | - | - | - | - |
| * | - | - | - | - |
| 20.00 | CARTOON | PLEASURE | 0,60 | 5,00 |
| 20.05 | INFORMATION | TIMETABLE | - | - |
| 20.08 | COMMERCIAL | TOOTHPASTE | 0,60 | 5,00 |
| 20.10 | COMMERCIAL | CARS 1 | 0,50 | 2,00 |
| * | - | - | - | - |
| * | - | - | - | - |
| * | - | - | - | - |

50

| TIME | SUBJECT | CATEGORY | PRIORITY | EXPOSE |
|---|---|---|---|---|
| * | - | - | - | - |
| * | - | - | - | - |
| * | - | - | - | - |
| 18.00 | CARTOON | PLEASURE | 1,00 | 5,00 |
| 18.05 | COMMERCIAL | CARS 1 | 1,00 | 2,00 |
| 18.08 | COMMERCIAL | TOOTHPASTE | 1,00 | 5,00 |
| 18.10 | COMMERCIAL | CARS 2 | 1,00 | 3,00 |
| * | - | - | - | - |
| * | - | - | - | - |
| * | - | - | - | - |
| 19.00 | CARTOON | PLEASURE | 0,08 | 5,00 |
| 19.05 | INFORMATION | TIMETABLE | - | - |
| 19.08 | COMMERCIAL | TOOTHPASTE | 0,08 | 5,00 |
| 19.10 | COMMERCIAL | CARS 2 | 0,67 | 3,00 |
| * | - | - | - | - |
| * | - | - | - | - |
| * | - | - | - | - |
| 20.00 | CARTOON | PLEASURE | 0,60 | 5,00 |
| 20.05 | INFORMATION | TIMETABLE | - | - |
| 20.08 | COMMERCIAL | TOOTHPASTE | 0,60 | 5,00 |
| 20.10 | COMMERCIAL | CARS 1 | 0,50 | 2,00 |
| * | - | - | - | - |
| * | - | - | - | - |
| * | - | - | - | - |

FIG. 2

INFORMATION SYSTEM

TECHNICAL FIELD

The present invention relates to a method and to an arrangement of assigning an information-category and a priority of exposure for spots or blocks of information for controlling and coordinating display devices in a digital information system for displaying information on at least one display device through the medium of at least one display for each said device, said information being displayed in places that are accessible to and/or frequented by the general public. In one particular aspect, the invention is applied to control display devices for displaying information directed towards people in such places as main railway stations, subway stations, airport waiting lounges, cinemas, private homes, etc.

DESCRIPTION OF THE BACKGROUND ART

From the Swedish patent publication SE-C2-507-473, and from the International Publication WO 97/41546, hereby incorporated by reference, both by the same applicants as for the present invention, a flexible system is known in which external information mediators are able to dynamically control in real time the transmission of display information to a larger public in different places situated at any chosen distance apart through display devices which project information onto displays intended therefor.

One object of the known system is to enable pictures, images, messages and announcements to be configured in accordance with modern digital technology, therewith providing rapid communication. A further object of it is to enable a picture, image or other information to be changed in practice as often as is desired, in real time, therewith providing direct and immediate communication, and to enable similar or specific information to be displayed in places that are mutually far apart and to enable message information to be alternated with advertising spots, for instance.

According to one aspect, the known system relates to a method of coordinating and controlling display devices in a digital information system for displaying information on a display device through the medium of a projector, whereby the information being displayed in places that are generally available to and frequented by the general public.

Information display subscribers are connected to a computerized control center via computer and telecommunication interfaces for all-day-round transmission of information. The control center has a communication interface against computerized devices situated in connection with said places for display device coordination and control.

The control center is able to create and update a display/play/exposure list in real time with control instruction fields via booking information for display dynamically in time from mediators having drive routine means which are connected to the subscription and which are transparent for the transmission of information to the drive routine means of the control center for transmission of information in the system.

A display list includes control instructions, which coordinate and control the projectors concerned with regard to what shall be displayed, when it shall be displayed, where it shall be displayed and for how long it shall be displayed, and causes projectors, independently of other projectors, to receive the same or different information for display in accordance with the display list.

An administrator of the digital information system is able to update the display list with desired information at any time whatsoever, wherein the dynamic booking can be changed or delayed.

The projector may also interrupt the display of information when the allocated display devices, or the projector, are visually obstructed in said public place.

In one embodiment, the exposure list may include reserved instruction fields for updating with control instructions via the mediator interface, wherein the control instructions can be placed in a waiting line, or queue, when the exposure list lacks instruction updating fields at that moment in time.

The known system also relates to an arrangement of apparatus for carrying out the aforesaid method, said apparatus including the aforesaid devices and an exposure handler which creates the exposure list.

Prior art, prior to the Swedish patent publication SE-C2-507-473 and the International Publication WO 97/41546, did not consider or propose the use of a display or play or exposure list. Hence, such prior art displays blocks of different information which, for example, are of the length of one (1) hour which are principal repeated each hour. If new information is to be displayed the block of information has to be revised, which can be accomplished in many different ways, not one of them sufficiently disclosed through prior art. The prior art systems are very time consuming in introducing new blocks of information and do not at all have the inherit dynamic capacity introduced by a display list for a possible 24-hour cyclic display at various time periods. Also, such a display list makes it impossible to repeatedly re-transmit blocks of information.

A drawback and problem related to the known system described in said patent and application, respectively, is that the play list is unevenly used for displaying ordered spots/blocks of information from mediators. If, for example, a projector interrupts the display of information when the allocated display devices, or the projector, are visually obstructed in said public place, for example, by an incoming train, spots/blocks of that piece of information should be displayed at another suitable time period according to the display/play/exposure list. This is not an easy task to accomplish in order to implement fairness and other parameters controlling the willingness of mediators to use such a system.

There are more events to even out at, for example, a subway station such as failing projectors/cameras/digital displays, emergency messages shown on displays, time table displays, etc.

Therefore, effective methods or schemes and arrangements are needed to solve problems related to the above.

SUMMARY OF THE DISCLOSED INVENTION

It is an aspect of the present invention to solve problems related to assigning an information-category and a priority of exposure for spots or blocks of information for controlling and coordinating display devices in a digital information system controlled or partly controlled by a display or play or exposure list, or the like, in accordance with the attached independent claims and embodiments of the present invention as set forth through the attached dependent claims.

In order to accomplish the aforesaid, the present invention sets forth a method of assigning an information-category and a priority of exposure for spots or blocks of information in a digital information system. The method comprising coordinating and controlling of display devices for exposing information on at least one display device through the medium of at least one display device, wherein the information is displayed in places accessible to and frequented by the general public or on television. Subscribing information mediators are connected to a computerized control center via interfaces for data and telecommunication for round-the clock transmission of information. The control center has communication interfaces against computerized devices situated in connection with said places for coordinating and controlling projectors/cameras/digital displays. Said control center is able to create and update an exposure list in real time with control instruction fields via dynamic booking of information in time for exposure from mediators.

Mediators having drive routine means connected to the subscription, which may be transparent for transmission of information with the drive routine means of the control center for transmission of information in the system via interfaces. The exposure list with control instructions coordinates and controls the display devices with regard to what shall be exposed, when it shall be exposed, where it shall be exposed and for how long it shall be exposed, and enables each display device to be controlled. This can be achieved independently of the other display devices, to receive the same or different information in accordance with the exposure list for exposure of respective display devices through the computerized devices.

This is accomplished by determining how many times particular information is to be exposed during a specific time period, e.g. for one day, for a week, etc., when booked, whereby single spots or blocks of information are assigned a specific information-category and a priority for exposure. The priority decrements a specific unit of priority for each exposure, displaying said information according to the assigned priority, then exposure interruption due to visual inaccessibility of information by viewers is evened out during said specific time period for single spot or block of information.

An embodiment of the present invention provides an exposure list divided into a plurality of time slots. Each time slot can belong to a specific category of information.

One embodiment of the present invention requires that information assigned a specific information-category and is exposed with information from at least one different information-category between the exposures. Said specific information-category can be given a specific code for placement in the exposure list.

Yet another embodiment includes priority sequencing which is equal for every new information entry into the system.

A further embodiment includes priority sequencing which decrements with the priority number divided by all the entries of a specific information spot or block and preferably rounded or truncated if the division is an infinite decimal figure.

A still further embodiment requires said single information spot or block with the highest priority level to be exposed, and that information spots or blocks which priority has reached the level of no priority are abandoned or dropped from exposure.

Another embodiment comprises information spots or blocks which are exposed sequentially in series if they have the same priority.

Yet another embodiment includes information spots or blocks having higher priority than zero, or the like, in the same information-category and a system choice information is played between each information of the same category.

In addition the present invention comprises an arrangement for the assigning of an information-category and a priority of exposure for spots or blocks of information in a digital information system in accordance with the above-described system further comprising:

- determining means calculating how many times an information is to be exposed during a specific time period when booked;
- category assigning means, whereby single spots or blocks of information are assigned a specific information-category;
- priority assigning means for priority of exposure for an information;
- computing means for decrement of priority a specific unit of priority for each exposure, displaying said information according to assigned priority; and
- thus enabling that exposure interruption due to visual inaccessibility for information viewers is evened out during said specific time period for a single spot or block of information.

Information assigned a specific information-category in one embodiment is exposed through the system with at least one different information-category between themselves.

Said specific information category is given a specific code for placement in the exposure list by said category assigning means in one embodiment.

The priority is equal for every new information entry into the system in one embodiment.

In one embodiment, the priority decrements with the priority figure divided by all the entries of a specific information spot or block and preferably truncated if the division results in an infinite decimal figure through said computing means.

An embodiment of the present invention provides an exposure list divided into a plurality of time slots. Each time slot can belong to a specific category of information.

A single information spot or block with the highest priority level is exposed, and information spots or blocks which priority has reached a level of no priority are abandoned or dropped from exposure by the system in another embodiment of the invention.

Information spots or blocks are exposed sequentially in series by the system if they have the same priority in one embodiment of the arrangement.

In yet another embodiment, said information spots or blocks having higher priority than zero, or the like, in the same information-category, a system choice information is exposed by the system between each information of the same category.

BRIEF DESCRIPTION OF THE DRAWINGS

The following description makes reference to the text in the accompanying drawings to provide a better understanding of the embodiments of the present invention, whereby:

FIG. 2 schematically illustrates a display list implemented through the method of the present invention.

DETAILED DESCRIPTION OF THE PREFERRED EMBODIMENTS

Figure 1:
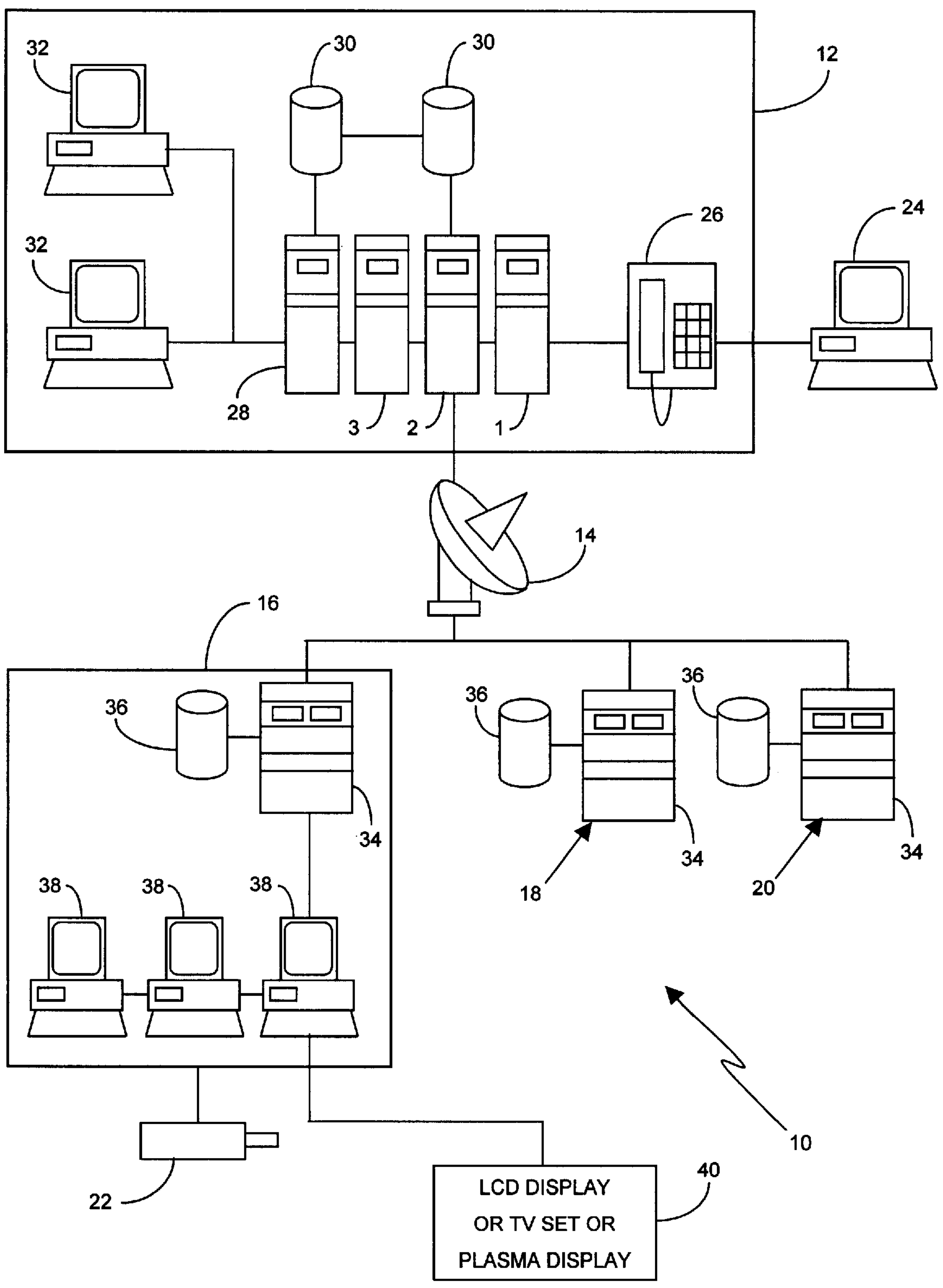
FIG. 1 schematically illustrates a system for coordinating and controlling display devices in a digital information system for displaying information in accordance with the invention.

The present invention relates to a method of assigning an information-category and a priority of exposure for spots or blocks of information for the dynamic coordination and control of display devices in a digital information system for displaying information on at least one display device via at least one projector for each display device, wherein the information is displayed in places that are accessible to and frequented by the general public. The invention also relates to an arrangement of apparatus for carrying out the method.

From the Swedish patent publication SE-C2-507-473 and from the International Publication WO 97/41546, both by the same applicants as for the present invention, such a dynamic system is known.

The present invention describes and claims how to make use of a display/play/exposure list according to a dynamic system in order to overcome disadvantages related to unexposed information spots or blocks in the list.

Prior art, prior to Swedish patent publication SE-C2-507-473 and the International Publication WO 97/41546, did not consider or propose the use of a display or play or exposure list. Hence, such prior art displays blocks of different information which, for example, are of the length of one (1) hour which are in principal repeated each hour. If new information is to be displayed, the block of information has to be revised, which can be accomplished in many different ways, no one of them sufficiently disclosed through prior art. Those prior art systems are very time consuming in introducing new blocks of information and do not at all have the inherent dynamic introduced by a display list for a possible 24-hour cyclic display at various time periods. Also, the display list makes it impossible to repeatedly re-transmit blocks of information.

It is to be understood that a projector/camera itself can be a digital display device or incorporated in a digital display device such as an LCD-display or a plasma display device, a digital television set, etc.

Although implementation of embodiments are limited in the following to subway railway stations, it will be understood that the invention is not restricted to these embodiments. As before mentioned, the inventive system can be used in places where large sections of the public are known to visit or look at advertisements, such as railway stations, airports, outdoor locations, cinemas, in homes looking at television, etc., in addition to subway stations.

Preferred embodiments of the invention will now be described, in detail, with reference to the accompanying drawings, where FIG. 1 schematically illustrates a digital information system 10, as disclosed through Swedish patent publication SE-C2-507-473 and the International Publication WO 97/41546, for coordinating and controlling projectors in a digital information system for displaying information on display devices, such as free-standing picture screens, wall-mounted screens, walls, and overhead screens or other means suitable for reproducing or exposing picture information in the form of text, stills, movable pictures, images, etc. (displays not shown in the drawing).

In the main, the system is comprised of a control center 12 having a communication interface 14 which connects an unlimited number of computerized devices 16, 18, 20 which are placed at desired distances from one another for the control of projectors 22, or as mentioned other projectors such as LCD-display, TV-set 40, etc. whose projector images or pictures are displayed in the aforesaid public places.

Hence, in other embodiments of the devices included in the computerized devices 16, 18, 20, the projector 22 is replaces with an electronic display (not shown), such as a large picture screen in LCD technology, light-emitting diode technology (LED technology) or the like. The station computer 34 is then included in the large picture screen or is connected externally thereof. Preferably, the projector computers 38 in the station computer 34 and the database 36 are also included. Information is transmitted from the control center 12 generally in the same manner as that before described. However, each separate large picture screen may be addressed directly through a radio network 14, wherein the screens are controlled from the control center 12 which includes redundancy. Thus, in the illustrated case, the computerized devices 16, 18, 20 form an electronic display with control computer 34, said projector 22 effecting the display.

The illustrated system also includes an advertising agency, which is connected to the control center 12 though the medium of a computer 24 and a modem 26 or the like. Although only one modem is shown connected to the central computer 28 of the control center, it will be understood that modem poles, telephone switching centers and other similar devices may be used to this end in accordance with present-day techniques. The advertising agency can also be a company for digital reproduction (repro) of information to be inserted in an exposure list according to prior art. Alternatively, control central 10 working stations 32 are both internal and/or external, thus the external working station(s) 32 make up or belong to said repro company. Hence, information mediators 24 can order their information to be inserted by an external repro company.

The central computer 28 in the control center 12 also includes databases 30, in the illustrated case two databases. The databases 30 may be externally connected to the central computer. The control center also includes working stations 32, which are preferably connected to the central computer 28 via a Local Area Network (LAN) in accordance with known techniques. The working stations 32 are used by the personnel serving the control center 12, in monitoring, checking, maintaining and updating functions in the central computer with its databases. The control center administrator is able to insert projector control instructions via the working stations, for instance when information is directed specifically to travelers and passengers travelling by ship, train, subway, aircraft or some other vehicular traffic who require specific information. The information may concern the arrival times and departure times of passenger-carrying vehicles. The administrator controls internally how, what, when or where the information shall be displayed by the projectors 22. An important feature in this context, however, is that external information mediators 24 are able to give control instructions to the projectors 22 with regard to the information that the external mediators 24 desire the system 10 to display via the projectors 22, each on its own initiative and communication-wise transparent via modems 26. This can be achieved in accordance with one embodiment of the prior art invention without involving the working stations 32 in the procedure of transmitting the control instructions to the central computer 28.

The term information mediator 24 used in the following shall be interpreted in its widest meaning, i.e. as not only referring to advertising agencies but to all companies and private persons who wish to utilize the system 10 for commercial reasons or for the display of information that concerns a general public. At present a mediator which wishes to display information in public places is normally forced to wait about two weeks, perhaps longer, before his order can be implemented and the information publicly displayed. With the inventive digital information system 10, the information can be displayed principally in real time, i.e. at the time of making the order, possibly with a short delay due to processing, fully-booked exposure lists and other quickly passing causes. Furthermore, an external information mediator 24 is able to put through information to the system 12 twenty-four (24) hours a day, whereupon the information can be included instantaneously in an exposure list, as illustrated in more detail below.

Those external information mediators which connect to the control center 12 via modems are, in one embodiment of the invention, connected to the control center via specially designed interfaces (drive routine means) for data and telecommunication. In this way, only external mediators 24 having the correct interface are able to connect transparently to the control center 12 for delivering control instructions to the projectors 22, which avoids unauthorized access to the display of such information and misuse of the system. In this regard, the special interface, which may be included in the computers of external mediators, also includes commercially available code keys or other codes sent between the control center 12 and the computer 24 of the external mediator to verify the right to enter control instructions into the central computer 28, without the administrator needing to supply through the working stations 32 further information or authority permitting access of the external information mediators 24 to the central computer for transmitting system transparent control instructions to the projectors 22.

In accordance with the prior art, the control center 12 has a communication interface 14 against the computerized devices 16, 18, 20 situated on shifting positions or places for projector coordination and control.

The drawing shows specifically a radio link which forms an interface between the control center 12 and the computerized devices 16, 18, 20, this interface being a preferred interface, although not necessarily the sole possible interface. Other interfaces for transmitting information between the control center 12 and the computerized devices 16, 18, 20 may consist of a cable-carried ISDN solution (Integrated Services Digital Network) or other fixed lines that have like or better capacity.

The digital information system 10 has been described in the foregoing with regard to respective hardware and interfaces. Implementation of the earlier invention in achieving its objects and purposes has been described in detail in the publications SE-C2-507-473 and WO 97/41546 mentioned above, which description is incorporated herein by reference.

Henceforth, the present invention will be described through an exposure list which covers a twenty-four (24) hour period for information exposure or display via display devices 22. The exposure handler 3 collects and processes, i.e. allocates, information relating to display device control instructions, wherein mediator information is sorted into the exposure list in accordance with the wishes of the mediator 24 or its instructions, when available spaces are found in the exposure list or in alternative places in the exposure list given by the mediator. If the exposure list is completely filled with instructions, the mediator instructions to the control center remain in the queue list in the server 1 in readiness for later inclusion in the exposure list, in accordance with a preferred embodiment.

In one embodiment of the digital information system 10, the exposure handler 3 creates or allocates a data message (data field) including a header, a control character field, an address field, optionally at least one CRC field (Cyclic Redundancy Code), and optionally status flags which identify and are connected to the information from an information mediator 24 and filed in the exposure list in the time interval that the information shall be exposed or displayed through a display device 22. This constitutes an alternative to the insertion of the entire information bit from an external mediator 24 in a specific time interval in the exposure list, and enables the provision of an exposure list that contains much less information and which is thus easier to handle, and to accelerate transmission of the list between computers and databases included in the system.

A data message in the exposure list can be understood here as being a control instruction in an instruction field for activating display devices 22 to project information. A data message of this kind connected to each individual information exposure enables known HASH or switching methods to find information included in the exposure time intervals in the exposure list both effectively and quickly.

In one embodiment of the digital information system 10, there is thus included an alternative to the dynamic updating of the exposure list as mentioned in the foregoing. The external information mediators 24 which do not have access to software in the exposure handler are provided with the possibility of having their picture material or exposure material processed by personnel serving the working stations 32, wherein said personnel enter, via the working stations 32, the information that the external mediator 24 wishes to have exposed, or displayed, via display device control instructions in the exposure handler and via the exposure list created by the handler. Personnel at the working stations 32 are thus able to interrupt any queue lists in the server 1 to update the exposure list, via the exposure handler, with information generated centrally from the control center 12 or with information that is insufficiently processed when received by the server 1 from the external information mediator 24.

In accordance with the foregoing, external information mediators 24 that have access to the exposure program are able to deliver complete picture series/films which can be processed automatically and inserted into the exposure list, or optionally personnel administering the working stations 32 are able to pick external mediator information from the queues, or lines, and process this information so that it can be inserted into the exposure list via the exposure handler 3. In order to be able to distinguish information that must be processed via the working stations, external mediators 24 can mark or label such transmitted material with an appropriate code, so that the central computer 28 is able to identify this material and send it to working stations 32 for processing. Alternatively, e-mail is processed and registered as information which must be processed.

As mentioned, prior art, prior to the Swedish patent publication SE-C2-507-473 and the International Publication WO 97/41546, did not consider or propose the use of a display or play or exposure list. Hence, such prior art teaches displaying blocks of different information which, for example, are of the length of one hour which are in principal repeated each hour. If new information is to be displayed, the block of information has to be revised, which can be accomplished in many different ways, none sufficiently or specifically disclosed through prior art. Those prior art systems are very time consuming in introducing new blocks of information and do not at all have the inherit dynamic introduced by a display list for a possible 24-hour display at various time periods. Also, the 24-hour display list makes it impossible to repeatedly re-transmit, for example, said one (1) hour blocks of information.

Also, sensors may be placed in the close vicinity of display devices 22, such as to detect any obstacle that may prevent display devices 22 from displaying information on screens (not shown). These sensors are connected to display device computers 38, so as to enable said signals to be transmitted to the station computer 34. Alternatively, the sensors may be connected directly to station computers 34. The sensors are of a typical kind which detect the presence of obstacles, for instance optical sensor which detect when a light beam is broken, microphones, electromagnetic transmitters or ultrasonic transmitters having one or more receivers, etc.

When a sensor (not shown) registers the presence of an obstacle between a display device 22 and a cloth screen or some other display surface, the display device is stopped from projecting pictures during the time that the obstacle is present.

The sensor may also function to place a cover in front of the display device lens, so that dust, dirt or the like cannot come into contact with the lens or the display screen when the display device 22 is not a camera.

When the information mediator is an advertising agency and the advertisements are to be displayed are in picture form, the advertising subscriber is able to buy a number of spots which are shown in the exposure list. The spots are shown, e.g., for a ten-second period, where, e.g. each sixth spot is a spot used by the transport company operating the subway, wherein this spot can be used partly for advertising purposes and partly for information purposes. The advertising subscriber may buy spots individually or in a special package, and the digital information system is able to insert a change at short notice, or to operate a completely new spot. The system is thus highly flexible and enables quick changes to be made with regard to what shall be exposed on the exposure means, where it shall be exposed and when.

Computer-produced pictures or exposures are delivered by external advertising agencies/newspaper agencies, etc., for exposure, or showing, in subways for instance. The pictures are received by a control center 12, which includes information material storage media. The control center 12, which includes information material storage media. The control center also decides what shall be exposed and in which order, and distributes the information material to the subway station 16, 18, 20. The control center 12 is also able to refrain from displaying information which conflicts with "good order" or accepted moral 5 or which may be of a disturbing nature to the large majority of the public, possibly through the medium of working stations 32 and via control routines. The display of such information can also be prevented through the medium of the contracts signed by external information mediators 24 when obtaining an account or a subscription.

Those screens that are obstructed, e.g. by incoming subway trains, shall be "extinguished" during the time the train is located in the station. Synchronization in this regard is controlled by the station computer 34. This enables screens that are not obstructed to continue to receive exposure information from display devices 22.

The display device computer 38 informs the station computer 34 of the display device address, picture number/name, exposure duration and the time of the exposure, through the medium of function control means in said station computer. In the event of a malfunction/mains failure or a power cut, the station computer 34 reports this occurrence to the control center 12. The central computer 28, in turn, monitors the station computers 34 at regular intervals.

The information material to be exposed, or shown, is down-loaded from the control center 12 to the station computers 34. Because each display device 22 has its own display device computer 34, information material can be sent to the station computer 34 at any time in a calendar day without disturbing exposure on the station 16, 18, 20. When necessary, the exposure list can be changed or stopped in respect to all display devices 22 or in respect to certain display devices for showing specifically chosen information.

The computers 34 include counters which function to register, e.g. in tables or other registers, the length of time over which the information concerning each external information mediator 24 has been exposed, or shown. Thus, when so considered by an administrator, the mediator 24 need only pay for the actual time during which the information was displayed and is not required to pay a single down payment for, e.g. round-the-clock display over a seven (7) day period, as is at present the case.

A drive routine means which interrupts the showing of exposures when the exposure means is hidden from the display device 22, or vice versa, can also be used as feedback and monitoring in statistical analyses of the subway administrator in the present invention as to whether or not trains are running in accordance with the timetable, this being of interest for drawing up the exposure list and future updating of said list, among other things. This is effected by registration in the station computer 34 when a picture or exposure showing is interrupted. Registration may be effected, for instance, via interrupt routines for the computer 34. The registration may also trigger a clock (counter, timer) to register the time during which a vehicle obstructs the screen or the display device 22, respectively.

FIG. 2 depicts a schematic display/play/exposure list 50 in order to explain and clarify some of the preferred embodiments of the present invention in greater detail.

The columns in FIG. 2 are marked with the following headings: Time, Subject, Category, Priority and Expose, which should be fairly self explainable. Nevertheless, Expose is for how many times a certain subject should be exposed on a display. The schematic play list 50 comprises three subjects: cartoon, commercial and information (here administrator information).

Two commercial spots are of the same category, namely Cars 1 and Cars 2 and should preferably not being displayed in series (directly after another). The advertisements or spot Cars 1 and Cars 2 shall be exposed 2.00 and 3.00 times, respectively. Decimal figures are provided because of possible rounding or truncation when computing new priorities.

As can be seen from FIG. 2, the priority unit used for a new entry into the display list 50 is 1.00. For simplicity, all of the entries around 18.00 hours are new ones thus being given priority 1.00. At 19.00 hours, they are to be displayed once again. As can be seen, the entries in the list 50 have new priority figures, calculated from 1.00-(Priority/Expose). Priority figures and priority calculations can, of course, be accomplished in various ways, this being a possible one.

It is seen in FIG. 2 that Cars 1 spot has been forced to give up its display time 19.05 for display of, for example, administrator information, here time table information. Hence, Cars 1 spot priority is not to be decremented. Instead the cars 1 spot takes the place of the Cars 2 spot display in the 20.00 hour display because its priority 0.5 is now higher then the Cars 2 priority 0.33.

It is preferable in one embodiment that the same categories of information are not to be displayed one after another, thus moderating the competition amongst, for example, two different car manufactures Cars 1 and Cars 2, and for other possible reasons.

In one embodiment of the play list 50 every time period for displaying information spots can have a category assigned to it, for example, so that toothpaste commercials and other categories are shown at specific time periods controlled by the display list 50. Hereby hindering a display of, for example, three toothpaste commercials in a row.

As is obvious from the display list 50 depicted in FIG. 2, the single dots or star characters on the rows of column Time indicate a cyclic display list 50. But not meaning that displays are repeated cyclicly every time a block of information has been displayed, if the 18.00–20.00 hours displays in FIG. 2 are considered as blocks. This also elucidates that there is a big difference between prior art cyclic block displays and the display list 50 introduced through publications SE-C2-507-473 and WO 97/41546.

Hence, it is determined how many times an information is to be exposed through the control of the display list 50 during a specific time period when booked, whereby single spots or blocks of information are assigned a specific information-category and a priority for exposure. The priority decrements a specific unit of priority for each exposure, thus exposure interruption due to visual inaccessibility for information viewers is evened out during said specific time period for a single spot or block information.

A specific information category is given a specific code of placement in the exposure list 50 in one embodiment of the invention.

It is common to arrange so that single information spots or blocks with the highest priority level are exposed, and that information spots or blocks which priority has reached the level of no priority are abandoned or dropped from exposure.

It is also preferred that information spots or blocks having higher priority than zero, and are in the same information-category are not brought to contest. Instead, a system choice information is played between each information of the same category. It may be a cartoon or any other information decided by the system.

In addition, the present invention also comprises an arrangement for the assigning of an information-category and a priority of exposure for spots or blocks of information in a digital information system in accordance with the above-described system with a display list 50, and further comprising:

- determining means calculating how many times an information is to be exposed during a specific time period;
- category assigning means, whereby single spots or blocks of information are assigned a specific information-category;
- priority assigning means for priority of exposure for an information;
- computing means for decrement of priority a specific unit of priority for each exposure, displaying said information according to assigned priority; and
- thus enabling that exposure interruption due to visual inaccessibility for information viewers is evened out during said specific time period for a single spot or block of information.

Information assigned a specific information-category in one embodiment is exposed through the system with at least one different information-category between themselves. Said specific information-category is given a specific code of placement in the exposure list 50 by said category assigning means in one embodiment.

It is appreciated that the means used in the arrangement described above may be accomplished as software, hardware and/or firmware in the digital information system described through publications SE-C2-507-473 and WO 97/41546.

It will be understood that the aforedescribed embodiments of the present invention are not intended to limit the scope of the invention, but are merely intended as preferred modes of carrying out the invention. The invention includes other embodiments apparent to the person skilled in this art from the scope of the following claims.

We claim:

1. A method of assigning an information-category and a priority of exposure for spots or blocks of information in a digital information system comprising interfaces for data and telecommunications for round-the-clock transmission of information at places accessible to and frequented by the general public including places where television sets are placed, wherein a control center has communication interfaces for coordinating and controlling display devices, wherein the control center is able to create and update an exposure list in real time with control instruction fields via dynamic booking of information in time for exposure from mediators, wherein the exposure list with control instructions coordinates and controls the display devices with regard to what shall be exposed, when it shall be exposed, where it shall be exposed and for how long it shall be exposed, and enables each display device to be controlled, independently of the other display devices, to receive the same or different information in accordance with the exposure list for exposure of respective display devices, comprising the steps of determining how many times an information is to be exposed during a specific time period; assigning a specific information-category and a priority for exposure to single spots or blocks of information; decrementing the priority of a specific spot or block of information a specific unit of priority for each exposure; displaying said information according to the assigned priority, whereby exposure interruption due to visual inaccessibility for information viewers is evened out during said specific time period for single spot or block information.

2. The method according to claim 1, comprising the additional step of dividing said exposure list into a plurality of time slots.

3. The method according to claim 2, wherein each time slot belongs to a specific category of information.

4. The method according to claim 1, wherein the information assigned a specific information-category is exposed with at least one different information-category between themselves.

5. The method according to claim 1, wherein said specific information category is given a specific code of placement in the exposure list.

6. The method according to claim 1, wherein said priority is equal for every new information entry into the system.

7. The method according to claim 1, wherein said priority decrements with the priority figure divided by all the entries of a specific information spot or block preferably truncated if the division is an infinite decimal figure.

8. The method according to claim 1, wherein said single information spot or block with the highest priority level is exposed, and that information spots or blocks which priority have reached the level of no priority left are not exposed anymore.

9. The method according to claim 1, wherein in that said information spots or blocks are exposed in series if they have the same priority.

10. The method according to claim 1, wherein a system choice information is played between information spots or blocks having higher priority than zero in the same information-category.

11. An arrangement for the assigning of an information-category and a priority of exposure comprising interfaces for data and telecommunication for round-the-clock transmission of information at places accessible to and frequented by the general public including places where television sets are placed, wherein a control center has communication interfaces for coordinating and controlling display devices, wherein the control center is able to create and update an exposure list in real time with control instruction fields via dynamic booking of information in time for exposure from mediators, wherein the exposure list with control instructions coordinates and controls the display devices with regard to what shall be exposed, when it shall be exposed, where it shall be exposed and for how long it shall be exposed, and enables each display device to be controlled, independently of the other display devices, to receive the same or different information in accordance with the exposure list for exposure of respective display devices, comprising:

determining means calculating how many times an information is to be exposed during a specific time period when booked;

category assigning means for allocating single spots or blocks of information to a specific information-category;

priority assigning means for assigning an initial priority of exposure for an information;

computing means for decrementing the priority of exposure a specific unit of priority for each exposure; and thus enabling that exposure interruption due to visual inaccessibility for information viewers is evened out during said specific time period for a single spot or block of information.

12. The arrangement according to claim 11, wherein said exposure list is divided into a plurality of time slots.

13. The arrangement according to claim 12, wherein each time slot belongs to a specific category of information.

14. The arrangement according to claim 11, wherein said information assigned a specific information-category is exposed through the system with at least one different information-category between themselves.

15. The arrangement according to claim 11, wherein in that said specific information category is given a specific code of placement in the exposure list by said category assigning means.

16. The arrangement according to claim 11, wherein in that said priority is equal for every new information entry into the system.

17. The arrangement according to claim 11, wherein in that said priority decrements with the priority figure divided by all the entries of a specific information spot or block preferably truncated if the division is an infinite decimal figure through said computing means.

18. The arrangement according to claim 11, wherein said single information spot or block with the highest priority level is exposed, and that information spots or blocks which priority has reached a level of no priority are no longer exposed by the system.

19. The arrangement according to claim 11, wherein said information spots or blocks are exposed in series by the system if they have the same priority.

20. The arrangement according to claim 11, wherein a system choice information is exposed by the system between said information spots or blocks having higher priority than zero in the same information-category.

* * * * *